No. 764,483. Patented July 5, 1904.

UNITED STATES PATENT OFFICE.

JULES MAGGI, OF PARIS, FRANCE.

PROCESS OF INCREASING THE SOLUBILITY OF EXTRACTS.

SPECIFICATION forming part of Letters Patent No. 764,483, dated July 5, 1904.

Application filed May 18, 1903. Serial No. 157,709. (No specimens.)

*To all whom it may concern:*

Be it known that I, JULES MAGGI, a citizen of Switzerland, and a resident of Paris, France, have invented a new and useful Process of Rendering Solid or Liquid Substances Extremely Soluble, which is fully set forth in the following specification.

It is well known that the rapidity of solution of substances in a solvent of any kind, all other things being equal, depends upon the surface of contact offered by these substances to the solvent liquid.

This invention has for its object a process permitting of increasing the coefficient of solution of any substance in a liquid, and this by increasing the degree of dryness and porosity, thus modifying the contexture of the substance and increasing the surface of contact offered by the substance to the solvent liquid, thereby creating what is actually a novel product. With this object the substance is, first of all, prepared in the state of a paste, after which by either mechanical or chemical means air or a neutral gas is incorporated with it in such a manner that the paste contains in its interior a large number of gas-bubbles. It is then conveyed as rapidly as possible into any suitable vacuum drying apparatus. Owing to the vacuum in the apparatus, the paste swells under the influence of the air or gas which tend to escape, thus producing great porosity. The apparatus is then heated to the desired extent, according to the nature of the substances treated, in such a manner as to fix the porosity of the product. The product so obtained has the appearance of a dry and very porous body, and its coefficient of solubility is largely increased. Any desired external form may be given to the product in view of its future preservation or subsequent utilization or of its packing, &c., after it has been impregnated with air or gas and before the introduction into the vacuum drying apparatus.

This process may be applied to animal, vegetable, or chemical substances which are in the state of a paste or can be brought into such state by a previous treatment—as, for example, fluid substances which by evaporation in any well-known manner can be brought into a pasty state. As an illustration of my process as applied to milk, the first step is to bring it into the form of a thick paste, which may be effected by any of the methods now employed for condensing milk. Air or any suitable gas, as carbon dioxid, is then incorporated into the paste. This may be accomplished by kneading, beating, or stirring the paste by any mechanical means, whereby the air or gas will become entangled in the mass and produce a large number of bubbles, forming a frothy porous mixture. This is then transferred without delay to any suitable vacuum drying apparatus, where under the reduced pressure and at a low temperature the gases inclosed in the mass expand, thus producing great porosity. Heat is then applied to dry and harden or fix the product in its porous condition.

The porous condition in the paste may be obtained by means other than mechanical—as, for example, by chemical means. Substances which when brought together will produce a gas, such as a carbonate and an acid element, may be used. To one portion of the paste a suitable quantity of carbonate may be added and to the other portion the equivalent quantity of acid element. On mixing the two portions chemical action liberates carbon dioxid, which fills the paste with bubbles and renders it porous.

If desired, the milk paste may be made into the form of tablets. In such case sugar of any kind, cocoa, coffee extract, or the like may be first added to the paste. Then the gas is incorporated, and while the paste is moist it is formed into tablets, which are then submitted to the operations above described for drying and fixing the product in its porous condition. As thus treated the tablets are in a porous state and dissolve readily and more completely in either hot or cold water.

My process is equally applicable to chemical substances which are in the state of paste or can be so transformed, and it will increase their solubility in a like manner. Among such substances are artificial-indigo paste and medicinal extracts, such as that of licorice, and to meat extracts.

What I claim is—

The process of increasing the solubility of extracts in tablet form, consisting in incorporating gas in a pasty mass of said extract, forming the said mass into tablets, expanding the gas confined within the tablets by reducing the external pressure, and drying the same while retained in its porous condition.

In testimony whereof I have signed this specification in the presence of two subscribing witnesses.

JULES MAGGI.

Witnesses:
 JULES ROUSSET,
 J. ALLISON BOWEN.